April 15, 1924.   H. W. BOYD   1,490,762
TESTING MACHINE
Filed June 20, 1919   3 Sheets-Sheet 1
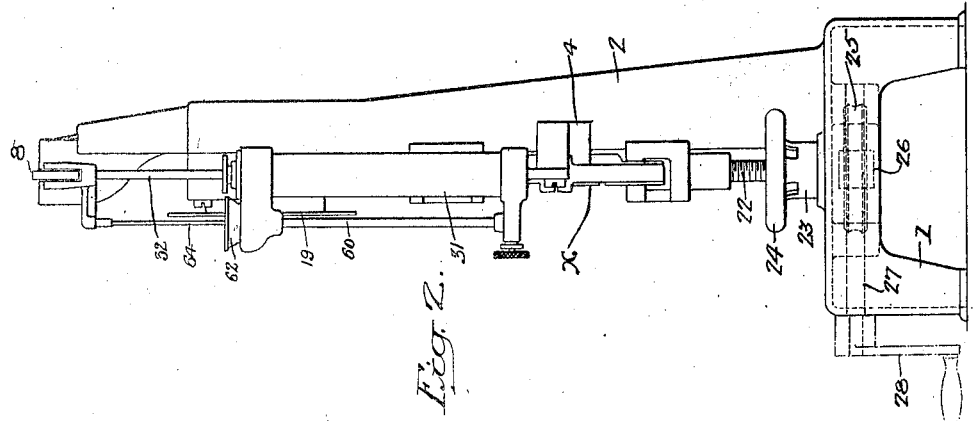
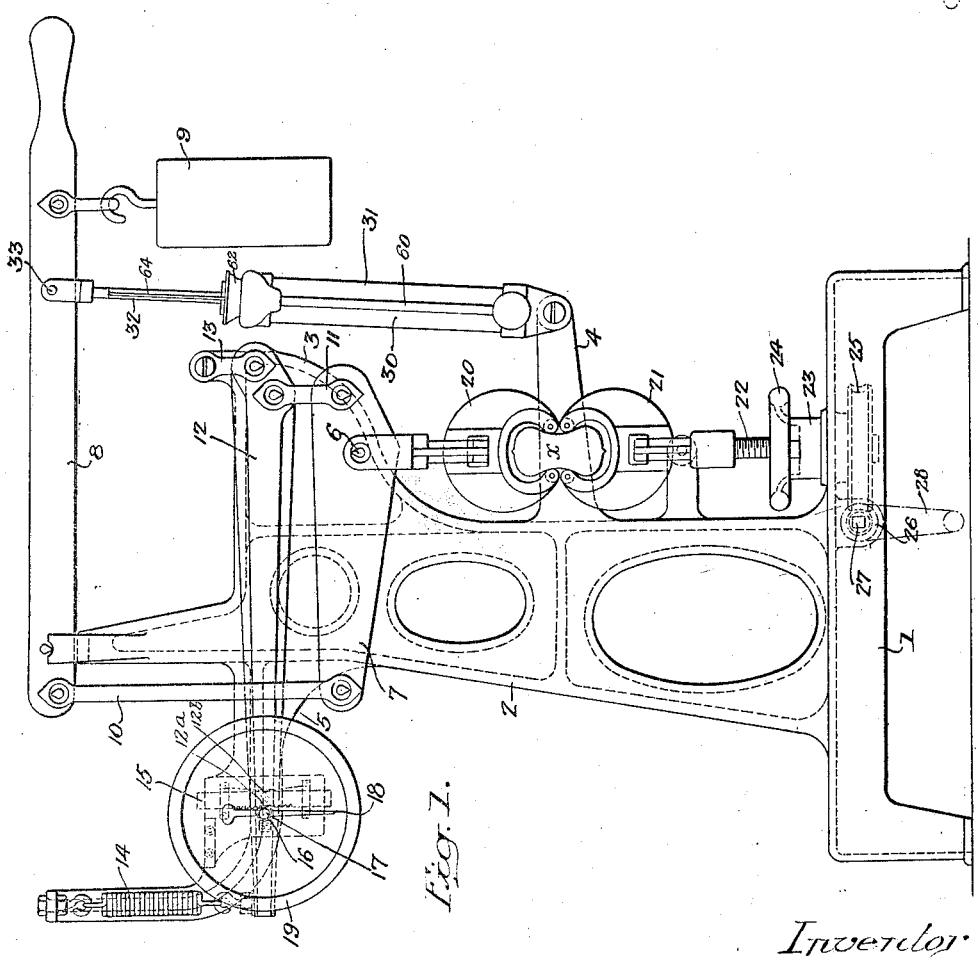
Inventor
Harry W. Boyd,
by his Attorneys,
Howson & Howson April 15, 1924.
H. W. BOYD
TESTING MACHINE
Filed June 20, 1919  3 Sheets-Sheet 2
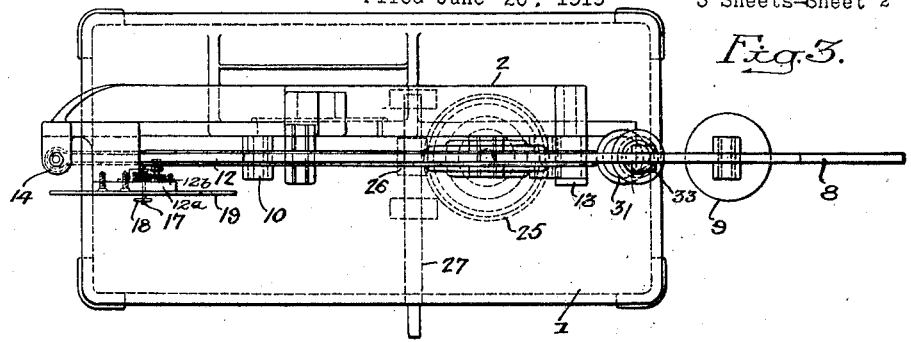
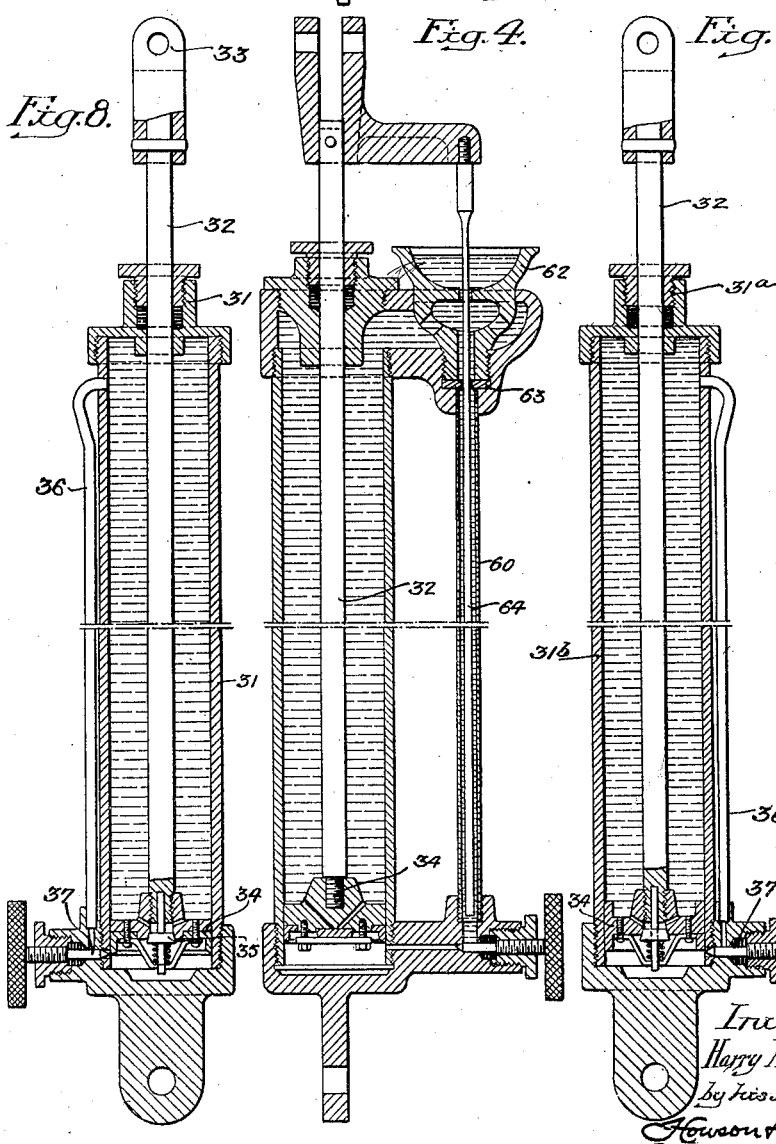
Inventor
Harry W. Boyd.
by his Attorney
Howson & Howson

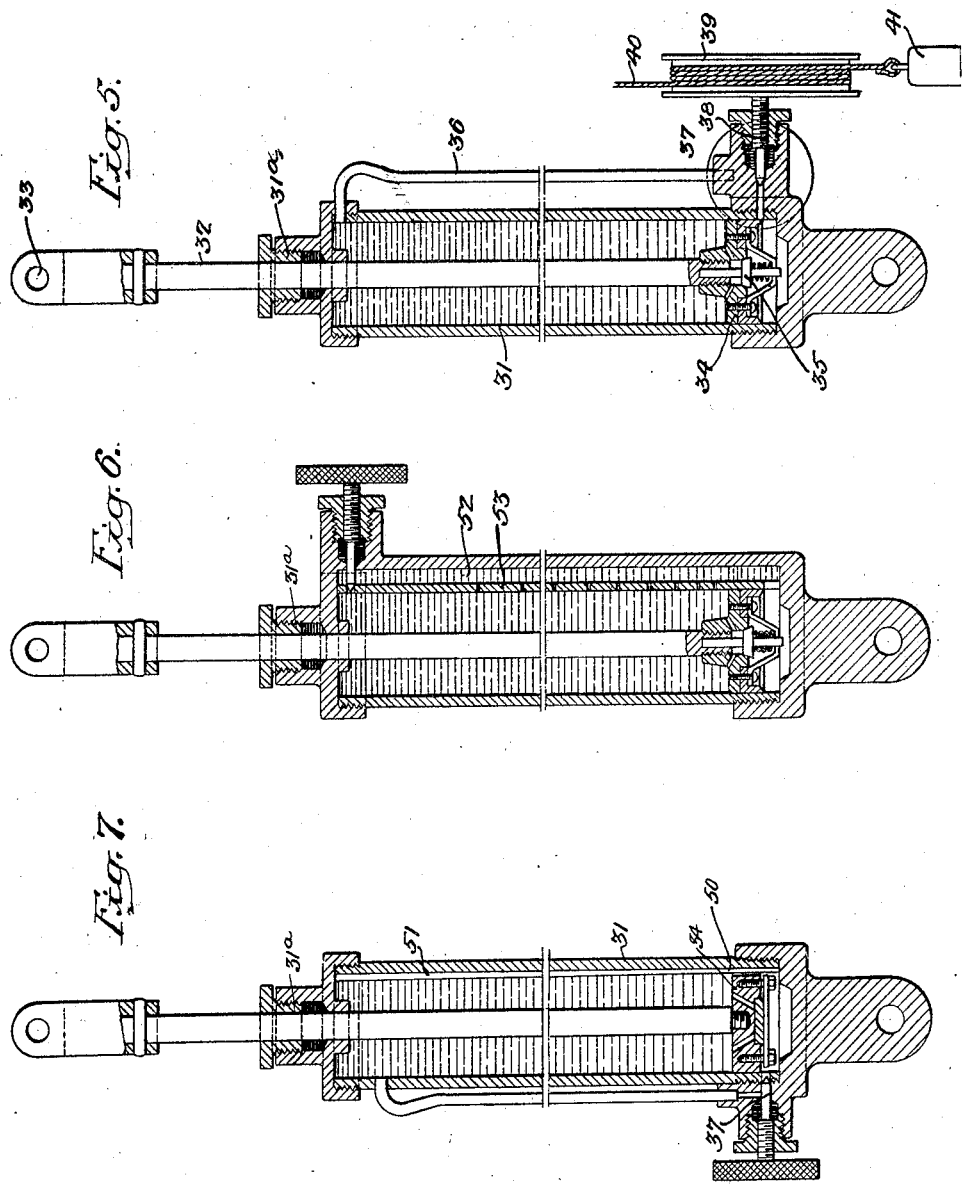

Patented Apr. 15, 1924.

1,490,762

UNITED STATES PATENT OFFICE.

HARRY W. BOYD, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

TESTING MACHINE.

Application filed June 20, 1919. Serial No. 305,566.

*To all whom it may concern:*

Be it known that I, HARRY W. BOYD, a citizen of the United States, residing in Philadelphia, Pennsylvania, have invented Testing Machines, of which the following is a specification.

One object of my invention is to provide a novel, compact and self contained device for insuring the uniform performance of work; said invention more particularly having to do with a reliable and inexpensive mechanism whereby the falling of a weight may be caused to take place at a uniform rate when said weight is performing uniformly increasing amounts of work.

Another object of the invention is to provide a relatively simple, substantial and accurate device whereby the rate at which a load is applied to any object or material may be rendered uniform or regulated at the will of the operator; the invention contemplating a novel combination of parts which in one of its forms, is particularly designed to automatically regulate the rate at which a weight is caused to apply stress to a test specimen.

Another object of my invention is to provide a relatively simple, substantial and conveniently operated machine for applying stress to any object or material such as a specimen of material to be tested; the invention more particularly contemplating a novel device for governing the movement of the load-carrying member and therefore the rate at which the load is applied.

A further object of the invention is to provide a novel arrangement of the recording or indicating device relatively to the point of connection of the weighing spring to the weighing lever in order to increase the accuracy of the indications of said device.

These objects and other advantageous ends I attain as hereinafter set forth, reference being had to the accompanying drawings, in which, Figs. 1 and 2 are respectively front and side elevations of a testing machine constructed in accordance with my invention;

Fig. 3 is a plan of the machine shown in Figs. 1 and 2;

Fig. 4 is a longitudinal section of the load-regulating device forming part of my invention; and Figs. 5 to 9 inclusive are longitudinal vertical sections illustrating modified forms of the load regulating device.

In Figs. 1 to 3 inclusive of the above drawings, 1 represents the base structure of a testing machine having an upwardly extending standard 2 formed with two horizontally projecting portions or brackets 3 and 4 at one side and a third projecting portion or bracket 5 on the opposite side. At the top of the standard 2 is fulcrumed a horizontally projecting lever 8 from the outer portion of whose long arm is suspended a weight 9 constituting the loading member of the machine or source of power for applying stress to a specimen, while the short arm of said lever is connected through a link 10 to the long arm of a main lever 7. The opposite end of this latter lever is connected through a link 11 with a weighing lever 12 which is hung from the outer end of the bracket 3 of the frame through a link 13. The outer end of the long arm of the lever 12 is supported through a spring 14 from the top of a turned up portion of the arm 5, whereby there is provided a definite resistance to downward movement of this end of the lever.

This same arm of said lever adjacent its outer end has a horizontally projecting plate $12^a$ extending above a pin $12^b$ which projects from a vertically guided rack 15 engaging a pinion 16 fixed to a spindle 17 which also carries a pointer 18. This pointer is mounted concentrically with a scale in the form of a graduated disc 19 supported on the arm 5 and is designed to coact with said disc to give indications of the maximum load applied to a test specimen. It is to be particularly noted that the plate $12^a$ for actuating the indicator is connected to the weighing lever 12 at a point between the weighing spring 14 and the point of connection of the link 11 and at some distance from said spring so that the correctness of the records of said indicator is not affected by the whipping action of said lever when the test specimen breaks.

A specimen engaging jaw 20 is hung from a knife edge 6 on the lever 7 and a second jaw 21 is connected to a spindle 22 threaded through a nut 23 which is held from longitudinal movement in the base 1, although free to turn. The upper part of this nut is laterally extended to provide a hand wheel 24 and its lower part has fixed to or integral with it a worm wheel engaged by a worm 26 carried by or forming part of a short shaft or spindle 27 journalled in the base 1 beyond one side of which it projects. This projecting portion of said shaft is squared for the reception of a crank handle 28 whereby the worm and through it the nut 23 may be turned at will.

If with the above described arrangement of parts, a test specimen x should be mounted in the jaws 20 and 21 and the weight 9 applied to the lever 8, the latter would at once exert on said specimen a definite force which, if of sufficient magnitude, would break it. Such a result would be unsatisfactory since, for the reasons among others, there would be no way of regulating the rate at which the load was applied and it would be impossible to obtain any exact record of the behavior of the test specimen or of the amount of force exerted upon it before it failed. In order therefore to utilize the weight 9 to apply to the test specimen what in the case shown would be a tensile stress, at a relatively slow rate which at the same time is uniform, I provide the dash pot or fluid controlling device 30 which includes an elongated cylinder 31 pivotally connected at one end to the arm 4. The second and upper end of this cylinder is provided with a stuffing box 31ª through which passes a rod 32 whose outer and upper end is pivotally connected at 33 to the outer end of the long arm of the lever 8,—in the present instance, between its fulcrum and the point of connection of the weight 9.

Within the cylinder 31 is mounted a piston 34 fixed to the rod 32 and having through it a passage or port normally closed by a valve 35 which however is so arranged as to permit relatively free flow of liquid within the cylinder from the upper to the lower portion of the piston, while preventing flow in the opposite direction. The two ends of the cylinder are connected by a conduit including a straight tube 60 extending parallel with the cylinder and opening at its upper end into a filling cup 61 connected to the upper end of said cylinder.

A removable diaphragm 63 having a perforation or opening therethrough, is removably mounted between the cup and the top end of the tube 60 and a rod 64 tapered from its lower to its upper end is mounted in said tube so as to be longitudinally movable therein and through the opening of the diaphragm. This rod is connected at its upper end to a lateral extension of the head on the upper end of the piston rod 32 and its length is preferably such that it extends practically to the bottom of the tube 60 when the piston is at the lowest part of its cylinder 31.

A stop valve 65 is mounted in the lower part of the conduit so as to permit of the cutting off at will of the flow of fluid from the lower end of the cylinder into the lower end of the tube 60. The arrangement and proportions of the parts are such that if the cylinder and conduit be filled with fluid and the piston 34 be moved to the top of the cylinder, a downward pressure exerted on the rod 32 will cause fluid to flow out of the bottom of said cylinder into the bottom of the conduit and into the tube 60;—the rate of this flow of fluid being dependent on such pressure and on the effective area of the opening in the diaphragm 63 as determined by the cross section of the rod 64.

Under operating conditions the lever 8 and weight 9 are first raised until the piston 34 occupies a position at the upper end of the cylinder 30 and the pointer 18 is in its zero position, after which the test piece x is mounted in the jaws 20 and 21 and the handle 28 or the hand wheel 24 is turned to take up any lost motion between them and said piece. If the lever 8 be now allowed to fall by opening of a valve 37 in the conduit connecting the two ends of the cylinder 31 the long arm of said lever is drawn downward by the weight 9 while a corresponding upward force is exerted through the link 10 on the long arm of the lever 7 and thence through the jaw 20 on the test specimen. Obviously however the liquid in the cylinder 31 below the piston 34 opposes this downward movement of the lever 8 and the amount of this opposition depends upon the size of the passage provided in the conduit 60 by the coaction of the diaphragm 63 and the rod 64.

As the liquid by the action of the piston 34 is forced out of the lower end of the cylinder 31 through the conduit 36 into the upper end thereof, the lever 8 is allowed to fall and the rod 64 is moved down in the tube 60 through the diaphragm so as to gradually enlarge the effective opening therethrough and maintain constant the rate of flow of the fluid, thereby causing the load provided by the weight 9 to be applied to the test specimen at a uniform rate. This weight 9 is of such magnitude that as the flow of liquid from the lower to the upper end of the cylinder continues, such a load is finally applied to the test specimen x as causes it to break, and the amount of this load—which is equal to the breaking strength of the test specimen—is shown by the pointer 18.

As the spring supported end of the weighing lever moves down during the application of the load to the specimen, its plate engages the pin, drawing down the rack, and turning the pointer which remains in position to give a reading of the maximum load applied. Said pointer may be returned to its zero position by pushing the rack upwardly; it being noted that the accuracy of the readings given by said pointer or other indicating means have been found to be materially increased by causing it to be actuated by a part of the weighing lever some distance from the point at which the weighing mechanism (in this case the spring 14) is applied and between that point about which said lever tends to rotate upon breaking of the test specimen and the point of application of the load.

From the above description it will be noted that as the weight 9 falls, the specimen under test absorbs an increasing proportion of the gravity effect of said weight and the device comprised by the cylinder, piston and its associated flow-regulating mechanism insures that such absorption or application of load occurs at a constant or uniform rate which in the cement testing machine illustrated may be at the rate of six hundred pounds per minute.

Obviously other devices than a conduit with the restricted orifice and tapered rod may be employed to insure flow of fluid from one end of the cylinder to the other at such a rate as will cause the load to be applied to any desired object or material at a uniform rate and as typical of such modifications of my invention, I may utilize the construction shown in Fig. 5, in which the two ends of the cylinder are connected by a conduit 36 having in it a stop valve 37. Said conduit also has a second valve 38 whose screw thread spindle has fixed to it a grooved pulley 39, and the rotation of this pulley causes said spindle to be moved in or out to close or open the valve. A cord or cable 40 is wound on the pulley and while one end thereof is attached to the lever 8, its second end has fixed to it the weight 41,— the arrangement and proportions of parts being such that when the stop valve 37 is open, flow of liquid is permitted from the lower to the upper end of the cylinder through the conduit 36. The falling of said lever 8 under the action of the weight 9 permits turning of the pulley 39 under the action of the weight 41 and a gradual opening of the valve 38, which permits the flow through the conduit 36 to be increased at such a rate as to cause a uniform application to the test specimen $x$ of the load provided by the weight 9.

In an extreme case I may altogether omit the automatic valve 38 as shown in Fig. 8 and manually open the stop valve 37 at such a rate as to cause the load to be applied to the test specimen or other object at the required or uniform rate.

Still another form of the invention is shown in Fig. 6 in which a passage 52 is formed to extend from one end to the other of the cylinder outside of and immediately adjacent its wall which is provided with a series of openings 53 connecting said passage with the cylinder and designed to be successively cut off from the lower end of the cylinder by the piston 34 as this moves downwardly. These openings 53 are so spaced as to permit the fluid to pass from the lower side of the piston into the conduit 52 and thence into that part of the cylinder above the piston at the rate necessary to insure the application of load to a test specimen as above specified.

As shown in Fig. 7 I may accomplish the desired result by providing the piston 34 with a peripheral slot 50 placed to receive a key 51 extending longitudinally within the cylinder 31. This key is tapered from the upper to the lower end of the cylinder and as in the other forms of my invention, so coacts with the walls of the opening 50 as to permit passage of liquid from the lower to the upper side of the piston at the constant rate necessary to insure the application at a uniform rate of the load provided by the weight 9.

In the case illustrated in Fig. 9, I may attain the desired result by using a cylinder $31^b$ which tapers from its lower to its upper end, with the result that the flow of fluid from the lower to the upper end of the cylinder under the action of the weight 9 occurs at a rate which insures the load being applied to the test specimen at a uniform rate.

In any case the stress to which a test specimen or other object is subjected is applied at a uniform rate until said specimen fails or the desired result is obtained, and the apparatus employed is of such a nature as to be automatic in its action as well as of the utmost simplicity of construction.

It is of course obvious that the device 30 as shown in Figs. 4 to 9 inclusive may be employed not only in connection with testing machines but also in connection with any other mechanism in which it is essential that a given work shall be performed at a uniform rate.

I claim:

1. The combination in a testing machine of a train of mechanism including a weight of fixed mass for loading a test specimen; and a dash pot device for causing the force exerted by said weight to be applied to the specimen at a uniform rate; with means for indicating the rate at which such force is applied to said specimen.

2. The combination in a testing machine of a train of mechanism including a source of power for applying a load to a test specimen; with a fluid controlled regulating device actuated by said source of power for causing the force exerted by the latter to be applied to a specimen at a uniform rate.

3. The combination in a testing machine of a train of mechanism including a source of power for applying a load to a test specimen; with a device including a fluid containing cylinder, a piston operative in the cylinder, and means for regulating the flow of fluid from one side to the other of the piston to cause the force exerted by the source of power to be applied to the specimen at a uniform rate.

4. A device for regulating the rate of application of a load consisting of a fluid-containing cylinder; a piston operative therein; with means for controlling the rate of flow of fluid from one end of the cylinder to the other while the piston is moving in said cylinder, consisting of a conduit with a tapering rod movable in the conduit.

5. A device for regulating the rate of application of the load consisting of a cylinder; a conduit connecting the opposite ends of said cylinder; a piston operative in the cylinder; with means for automatically varying the effective cross sectional area of said conduit in accordance with the position of the piston in the cylinder.

6. A device for regulating the rate of application of load consisting of a fluid containing cylinder; a piston operative therein; a conduit connecting the opposite ends of the cylinder; and an automatically acting device for varying the rate of flow of fluid through said conduit to cause the piston to move at a uniform rate in the cylinder.

7. The combination of a train of mechanism for applying a load including a weighted member; and means for regulating the rate of movement of said member under the action of gravity consisting of a fluid containing cylinder, a piston movable therein, a conduit connecting the ends of the cylinder, a perforated diaphragm in the conduit; and an element movable with the piston and operative through the perforation of the diaphragm for regulating the flow of fluid from one end to the other of the cylinder to cause the weighted member to move at a predetermined rate.

8. The combination of a train of mechanism for applying a load including a weighted arm, means for regulating the rate of movement of said arm under the action of gravity consisting of a fluid-containing cylinder, a piston movable therein, and automatic means for causing the fluid to flow at a constant rate from one end of the cylinder to the other to cause the load to be applied by said mechanism at a uniform rate.

9. The combination of a train of mechanism for applying a load including a weighted arm, means for regulating the rate of movement of said arm under the action of gravity consisting of a fluid-containing cylinder, a piston movable therein, a conduit connecting the ends of the cylinder, a perforated diaphragm in the conduit; with a tapering rod actuated by said mechanism and movable through the perforation of the diaphragm to cause the piston to move at a predetermined rate in the cylinder.

10. The combination in a testing machine of a weighing lever; means connected to said lever for applying load to a test specimen; a spring opposing movement of the lever; a rack actuated by but free to move independently of the lever and an indicator operated by the rack.

11. The combination in a testing machine of a weighing lever; means connected to said lever for applying load to a test specimen; a spring opposing movement of the lever; and indicating mechanism actuated by the lever in one direction independently of the spring and movable independently of the lever in the opposite direction.

12. The combination in a testing machine of a train of mechanism including a weight of fixed mass for applying an increasing load to a test specimen and a dash pot device positioned to cause said load to be applied to the specimen at a uniform rate and being connected to oppose a varying resistance to movement of said weight when it is applying a load to the specimen.

In witness whereof I affix my signature.

HARRY W. BOYD.